Patented July 12, 1932

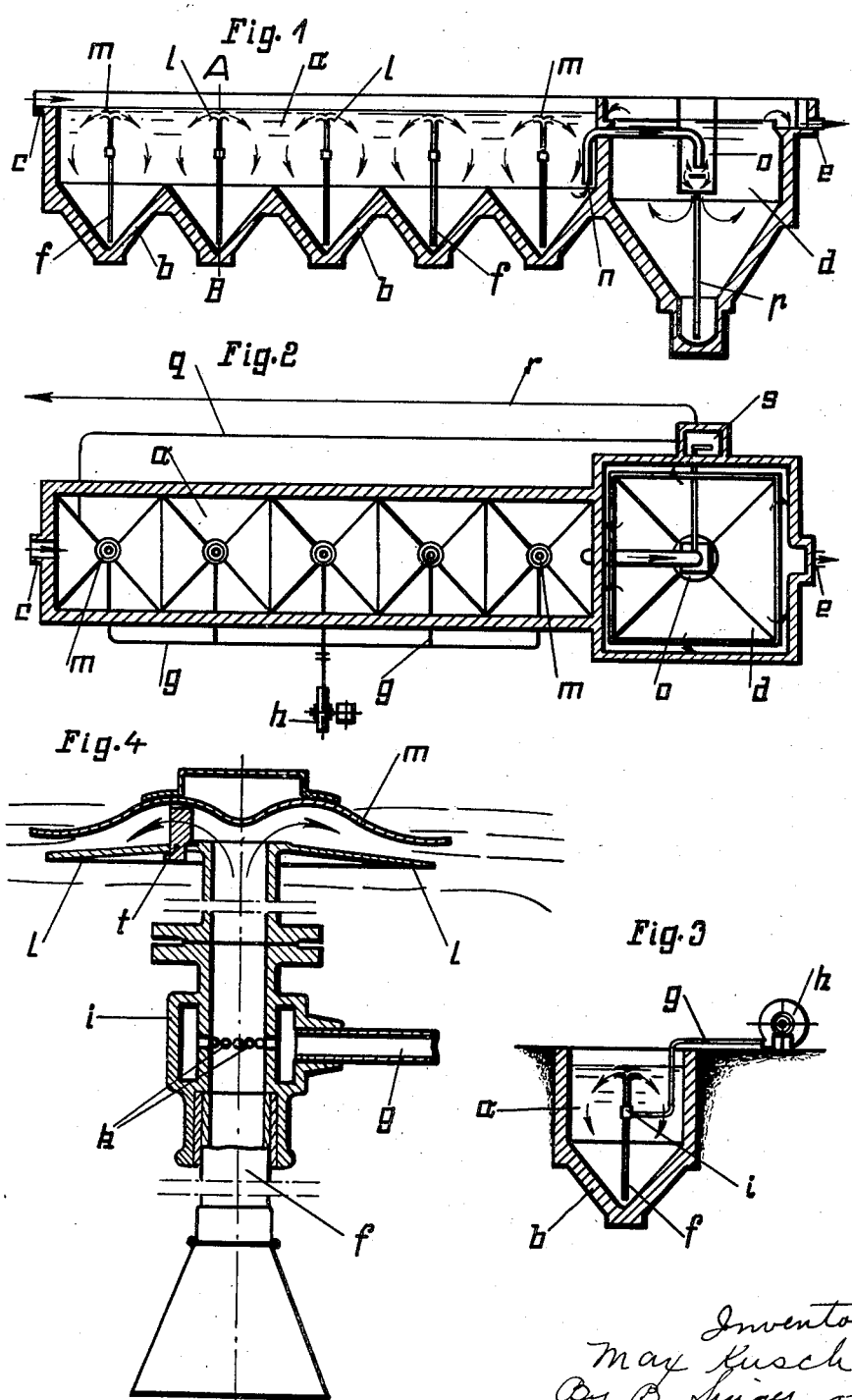

1,867,512

UNITED STATES PATENT OFFICE

MAX KUSCH, OF BERLIN-FRIEDENAU, GERMANY

APPARATUS FOR THE PURIFICATION OF WASTE WATER

Application filed November 26, 1928, Serial No. 322,000, and in Germany January 3, 1927.

My present invention relates to improvements in an apparatus for purifying waste water with quickened sludge.

In the purification of waste water with quickened sludge there are employed vessels with funnel-shaped bottoms which are preferably arranged in large number in series with each other, and are connected in common to a secondary clarifying vessel. For aerating and stirring up the sludge, there is employed air which is passed into the vessel and an ascending pipe which passes to the deepest portion of the funnel-shaped bottom.

It has now been found that a uniform and certain operation with the smallest consumption of power takes place on producing within the liquid a slight undulatory movement which is distributed over the largest possible surface. This is brought about according to my present invention by bringing liquid from the deepest portion of the vessel, aerating it and causing it to flow out, below the surface of the water and on all sides at the same time, through an annular channel. To this end, air is passed at a suitable position into the ascending pipe, preferably uniformly from the whole circumference, and the annular outlet channel extends outwards in the form of a nozzle with suitable curves in such a manner that the wave formation is produced by the flow. It has further been found that in such an arrangement a simple ventilator with a static excess pressure of about 0.6 to 1.0 m is sufficient for the purpose of producing the necessary aeration and stirring up the water. By means of the undulatory movement of the issuing waste water a constant and uniform movement of water is produced over the whole surface of the vessel and on account of the constant rise of water through the ascending pipe and its fall round the outlet extends through the whole depth of the vessel down to the deepest portion of the funnel.

My invention is presented by way of example by the accompanying drawing of which:

Fig. 1 is a longitudinal section through an aerating vessel and secondary clarifying vessel, Fig. 2 is a plan of the apparatus, Fig. 3 is a section corresponding to line A—B of Fig. 1, and Fig. 4 is a section through an ascending pipe shown on a larger scale.

The sludge quickening plant consists of a single vessel $a$, the bottom of which is formed by a number of funnel-shaped depressions $b$. The admission of the water to be clarified is effected through the pipe $c$ and to the main vessel $a$ there is connected a secondary clarifying vessel $d$ with an outlet $e$. Above the bottom of each funnel $b$ there is an ascending pipe $f$, and a common air pipe $g$ brings the air through a ventilator $h$ to each ascending pipe $f$. As may be seen from Fig. 4, the air passes through the pipe $g$ into an annular chamber $i$ which surrounds the pipe $f$ at any suitable position.

In the case of my present invention, it is possible to have the air inlet very high up in order to be able to manage with a relatively low pressure. Round the whole circumference of the pipe $f$ there are openings $k$ in the pipe so that the air can pass from outside the pipe into it uniformly in the condition of small bubbles. Owing to the fact that the air is passed in through many openings $k$, it flows directly up along the wall and through the whole cross section of the pipe and allows the water to rise fairly gently, because the particles of water are pressed off by the air from the wall of the pipe. In this way there is produced in the upper portion of the pipe a mixture of air and water of low specific gravity, and the waste water is thus sucked up from the bottom of the funnel and intensively aerated. The aeration thus extends to the whole cross-section of the pipe and the conditions of flow are in this way improved.

Above the pipe $f$, but still under the surface of the water, there is connected to the opening of the pipe a surrounding plate-like disc $l$ which is somewhat down-wardly inclined. This disc $l$ forms, together with a plate $m$ lying above the opening of the tube and carried by supports $t$, an annular outlet channel which is contracted outwardly like a nozzle and which, by means of a suitable corrugation of the lid $m$ or of the plate $l$ or of both, brings about an undulation of the issuing water which is also given a downward direction.

The ascending tube together with the apparatus pertaining thereto may naturally also be used with a vessel provided with a single funnel at the bottom. From the example illustrated by Figures 1 to 3, it may be seen that the apparatus can be advantageously employed for very large plants.

To the quickening vessel there is directly connected a suitable secondary clarifying vessel $d$, the preliminary clarified water being passed, for the purpose of a secondary clarification through the tube $n$ into the secondary clarifying vessel $d$, in which there are located a dipping pipe $o$ and a sludge pipe $p$. The piping diagram, represented in plan in Fig. 2, shows the passage of the return sludge through the pipe $q$, and the carrying away of the overflow sludge through a pipe $r$ from the reservoir $s$ which is connected to the secondary clarifying chamber.

Having now particularly described and ascertained the nature of my said invention and in what manner the same is to be performed, I declare that what I claim is:

1. Apparatus for the purification of waste water with quickened sludge, comprising a funnel shaped vessel, a submerged open ended ascending pipe having a submerged nozzle at its upper end comprising a lower disc through which said pipe extends and an upper disc spaced from said lower disc, said discs extending downwardly and also converging toward their peripheries and means to introduce air into the ascending pipe at a point intermediate the ends thereof.

2. Apparatus as claimed in claim 1, in which the nozzle at the upper end of the air ascending pipe comprises a lower disc through which said pipe extends and an upper disc spaced from said lower disc, said discs extending downwardly and also converging toward their peripheries and the said upper disc having an inverted conical central portion and being curved diametrically to present a concave surface above the inner portion of the lower disc and a convex surface above the outer portion of said lower disc.

In witness whereof I affix my signature.

MAX KUSCH.